(12) United States Patent
Conlon

(10) Patent No.: US 7,516,715 B2
(45) Date of Patent: Apr. 14, 2009

(54) BIRD FEEDER

(76) Inventor: Michael K. Conlon, 999 Wolver Hollow Rd., Upper Brookville, NY (US) 11771

( * ) Notice: Subject to any disclaimer, the term of this patent is extended or adjusted under 35 U.S.C. 154(b) by 0 days.

(21) Appl. No.: 11/040,188

(22) Filed: Jan. 21, 2005

(65) Prior Publication Data

US 2005/0211176 A1  Sep. 29, 2005

(51) Int. Cl.
*A01K 39/01* (2006.01)
*A01K 39/012* (2006.01)

(52) U.S. Cl. .................................. 119/52.2; 119/57.8

(58) Field of Classification Search ............... 119/52.1, 119/52.2, 52.3, 57.8, 57.9
See application file for complete search history.

(56) References Cited

U.S. PATENT DOCUMENTS

| | | | | |
|---|---|---|---|---|
| 2,683,440 A | * | 7/1954 | Klix | 119/57.8 |
| 4,664,066 A | * | 5/1987 | Steuernagel et al. | 119/52.2 |
| 4,732,112 A | * | 3/1988 | Fenner et al. | 119/52.2 |
| 4,955,319 A | * | 9/1990 | Brucker | 119/52.2 |
| 5,033,411 A | * | 7/1991 | Brucker | 119/52.2 |
| 5,063,877 A | * | 11/1991 | Riggi | 119/52.2 |
| 5,140,945 A | * | 8/1992 | Barnhart et al. | 119/52.2 |
| 5,183,005 A | * | 2/1993 | Tyler | 119/52.2 |
| 5,269,242 A | * | 12/1993 | Toldi | 119/52.2 |
| 5,479,879 A | * | 1/1996 | Biek | 119/52.2 |
| 5,642,689 A | * | 7/1997 | Harvey | 119/57.8 |
| 5,655,477 A | * | 8/1997 | Hoffman et al. | 119/52.2 |
| 5,775,257 A | * | 7/1998 | Park | 119/57.8 |
| 5,823,135 A | * | 10/1998 | Gilchrist et al. | 119/52.2 |
| 6,116,189 A | * | 9/2000 | Rundle | 119/51.5 |
| 6,578,725 B2 | * | 6/2003 | Delman et al. | 220/212 |
| 6,595,158 B1 | * | 7/2003 | Van Allen | 119/52.2 |
| 6,662,745 B2 | * | 12/2003 | Crisco et al. | 119/52.2 |

* cited by examiner

*Primary Examiner*—David J Parsley
(74) *Attorney, Agent, or Firm*—Lawrence I. Wechsler; Wechsler & Wechsler, P.C.

(57) ABSTRACT

A bird feeder includes a support and a body including at least one feeding station which is rotatably mounted to the support such that the body can be oriented in a feeding position and a refilling position. The body including a receiving chamber with an opening and a scoop at least partially receiveable in the receiving chamber. To refill the feeder, the scoop is removed from the body to scoop a quantity of feed. The scoop is then inserted, upwardly into the downwardly facing opening in the chamber in the refilling position. The body is then pivoted to the feeding position. Operation of gravity transfers the feed in the scoop to feeding station or stations which are located in the body of the feeder at a position below the open end of the scoop when received in the chamber.

18 Claims, 1 Drawing Sheet

BIRD FEEDER

BACKGROUND OF THE INVENTION

The present invention relates to a bird feeder, and, more particularly, to a bird feeder having a design which facilitates refilling thereof.

Bird feeding is a popular hobby, enjoyed by millions of people worldwide. However, a major drawback has been that many of the feeders currently available are difficult to fill. Consequently, bird hobbyists often seek to purchase larger capacity feeders, so refilling is required with less frequency. However, because of such larger capacity, the weight of the feeder is concomitantly increased, and individual refilling operations are made more difficult.

Accordingly, it is an object of the invention to provide a bird feeder which overcomes the drawbacks of the prior art.

It is a further object of the invention to provide a bird feeder which allows expedient and facilitated refilling thereof, in a form which can be produced simply and economically and combines previously separate elements of bird feeder and bird feeder scoop into a single unit.

SUMMARY OF THE INVENTION

In accordance with these and other objects of the invention, there is provided a bird feeder which allows a scoop for collecting and holding seed from a seed bag or other bulk feed source to be readily inserted into a seed containing chamber of the feeder for removable reception therein.

Briefly stated, the bird feeder in accordance with the invention includes a body which comprises a feed containing chamber having a chamber opening at one end of the body which is configured for reception of a removable feed scoop. Spaced apart from the chamber opening, the body includes one or more feeding stations at which feed contained in the chamber can be accessed by a bird visiting the bird feeder. The body is pivotably mounted to a support structure, such as, for example an armature disposed about the body, which is in turn is secured to a mounting structure, such as, for example, a tree limb, ground-secured pole, etc. By virtue of such pivotable mounting, the body of the feeder can be turned end to end such that the opening to the chamber is alternately oriented facing upwardly or downwardly.

When in an active feeding orientation, the scoop is retained in the chamber with the opening to the chamber facing upwardly. When feed in the chamber is exhausted, the body is pivoted so as to orient the chamber opening therein in a downwardly facing position. The scoop is then removed and filled with seed from a feed container, such as a bulk bag of seed, conveniently by a typical scooping operation, and then replaced with the contained seeds upwardly into the chamber opening of the at least partially inverted body. The body and scoop received therein are then pivoted together to a position in which the chamber opening is upwardly facing, again resuming an active feeding position.

The reception of the scoop in the body may be slidable or accomplished by any other removable operation, such as for example, threadable or other mutual engagement.

The above, and other objects, features and advantages of the present invention will become apparent from the following description read in conjunction with the accompanying drawings.

DETAILED DESCRIPTION OF THE INVENTION

Broadly stated, the invention comprises a feeder including a body having a chamber in which a feed-containing scoop is removably receivable through an opening therein, the body being pivotable about a generally horizontal pivot axis, thereby allowing the body to be rotatably movable between a first position corresponding to active feed operation in which the opening to the chamber is upwardly facing (active feeding position) and a second position corresponding to a refilling operation in which the opening is downwardly facing (refilling position). The scoop is open at a forward end, such that is can be advantageously filled with feed by a typical forward scooping motion from a feed-containing hopper. Once filled with feed, such as seeds, the scoop is then inserted, open end first, upwardly into the opening in the chamber, while the body is in the opening-downward position. The body is then pivoted back to the first position. Operation of gravity thereby transfers the feed contained in the scoop to at least one feeding station located in the body of the feeder at a position below the open end of the scoop received in the chamber.

Figure 1:
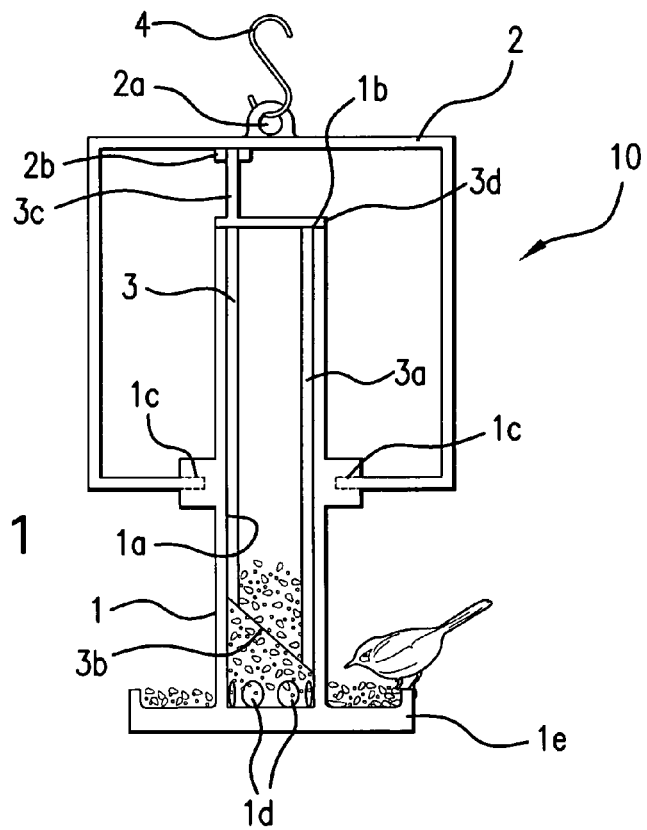
FIG. 1 is a side elevation of a bird feeder in accordance with an embodiment of the invention shown in an active feeding position.

Referring now to FIG. 1, a feeder according to an embodiment of the invention is depicted generally at 10. Feeder 10 includes a body 1, a support 2 and a scoop 3. Body 1 includes a receiving chamber 1a in which at least a length portion of the scoop 3 is slidably receivable through an opening 1b to the receiving chamber 1a. While, for simplicity of description, the embodiment employs slidable reception of scoop 3 in body 1 (advantageously in close engagement), it will be understood that any mutually cooperative structures suitable for allowing reception of the scoop 3 in receiving chamber 1a, such as for example threaded, bayonet or other mountable or engageable reception, may be employed without departure from the invention as contemplated.

The support 2, provided in the depicted embodiment conveniently in the form of a simple bilateral armature, is securable to suitable support structure (not shown), such as, for example, a tree limb, conveniently by use of a conventional "S" hook 4 which engages the support 2 by extending through a hanging hole 2a, which in the depicted example is located in the middle of the top of the support 2. Alternatively, feeder 10 can be pole mounted from below by attachment to the support 2 in conventional manner. The body 1 includes pivots 1c, conveniently, as shown, in the form of structural portions each with a receiving hole in which terminal ends of the support 2 are rotatably receivable, thereby permitting the body 1 to be rotated end to end about a generally horizontal axis while mountably retained to the support 2.

Figure 2:
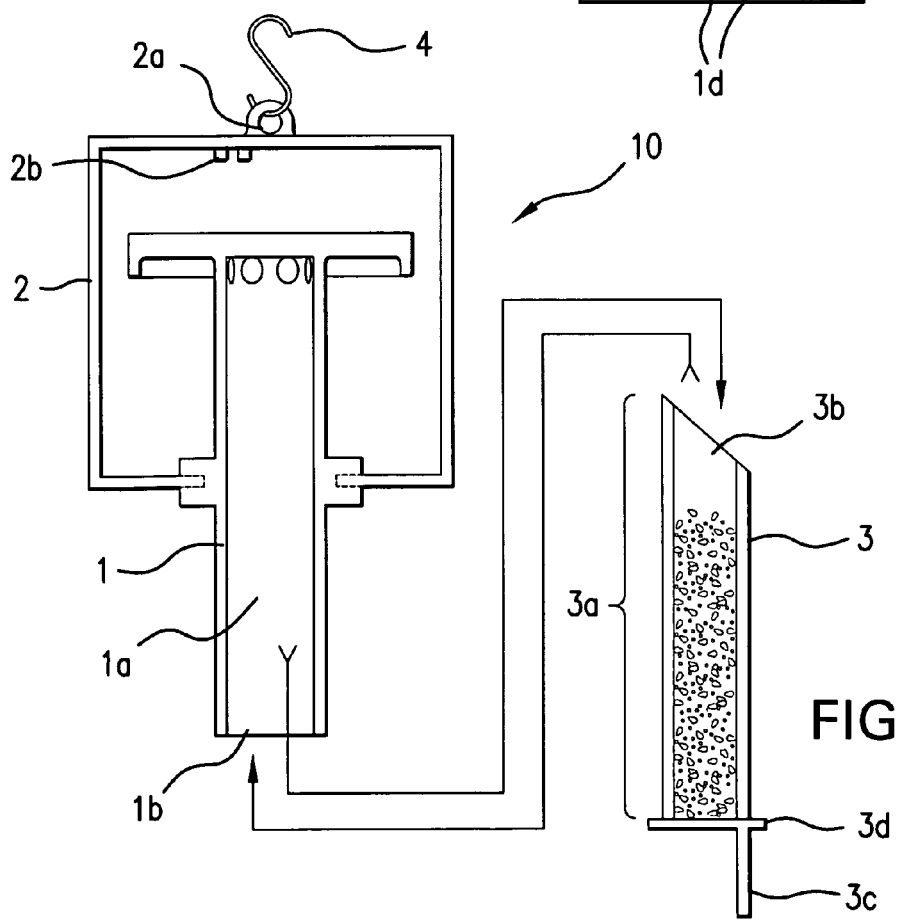
FIG. 2 is an exploded side elevation of the feeder of FIG. 1 shown in a feed replacement (refilling) position.

The scoop 3 includes a feed retaining portion 3a in which a quantity of feed can be held, and which includes an opening 3b at one end thereof. A handle 3c is optionally provided for added convenience during a feed scooping operation and, in the preferred embodiment depicted in FIGS. 1 and 2, provides the concomitant advantage, if so desired, of serving to secure the body 1 in an upright, active feeding position shown in FIG. 1, by engagement with cooperative structure carried on the support 2, conveniently provided in the form of a clip 2b between which the handle 3c of the scoop 3 is snapably receivable. An upright position of the feeder can alternatively be encouraged by selectively locating the pivots 1c which rotatably engage the support 2 on the receiving body non-centrally of a longitudinal extent of the scoop 3 and body 1 combination, and above a center of gravity thereof, such that gravity operating on the heavier portion below the pivots 1c maintains the feeder in an upright orientation. However, in this regard, it will be understood that the precise location of the pivots 1c along the body 1 is not essential to the invention, and the pivots 1c can be located centrally, as in the depicted example (and irrespective of the provision of the engageable clip 2b and handle 3c combination), or in any position on the body 1 between opposed ends thereof.

As mentioned above, the feeder 10 in FIG. 1 is depicted in an active feeding position, in which the opening 1b to chamber 1a is in an upwardly facing orientation. The body 1 includes one or more feed openings 1d at a position distant from opening 1b, such that feed contained in the feed retaining portion 3a of the scoop 3 is transferred by operation of gravity downward into a region of the receiving chamber 1a of the body 1 adjacent the feed openings 1d. At least a portion of the forward end of the scoop 3 at the opening 3b is located above the feed openings 1d, spaced apart from a bottom of the receiving chamber 1a when in the active feeding position with the scoop 3 received in the receiving chamber 1a, so as not to obstruct access by an animal to feed within the portion of the receiving chamber 1a adjacent to the feed openings 1d. This is accomplished conveniently, for example, by providing the scoop 3 with an annular flange 3d which shoulders against a top edge of the body 1, thereby preventing the scoop 3 from bottoming against the bottom of the receiving chamber 1a. It will be understood than many other structural means for achieving a suitable position of the scoop 3 within the body 1 may be alternatively adopted without departure from the invention, and such means for implementation are well known to one skilled in the art.

Feed openings 1d, providing the most basic of feeding station structure for allowing access by a bird to feed contained in the feeder 10, can each optionally be replaced with any suitable, and possibly more elaborate, feeding station employed in bird feeders to allow access to the feed contained therein. Also, an optional tray 1e can be provided as part of the body 1 (as shown) or as a separate part, to catch and present feed which exits the feed openings 1d.

When supply of feed in the feeder 10 is exhausted, facilitated refilling thereof with feed is accomplished by the appropriate operation described below. The body 1 is reoriented from the active feeding position shown in FIG. 1 in which the opening 1b to the receiving chamber 1a faces upwards to a refilling position as shown in FIG. 2 in which the opening 1b faces downward, by disengaging the handle 3c of the scoop 3 from the clip on support 2 and rotating the body 1 with scoop 3 received therein relative to the support 2. The scoop 3 is then slidably removed from the body 1 (it is noted, however, that removal could also be done before rotation of body 1 to the position shown in FIG. 2). Once removed, scoop 3 is filled With feed, conveniently by a scooping action, and thereafter replaced into the receiving chamber 1a of the body 1, which, while in an inverted, opening-down position allows replacement of the scoop 3 without appreciable loss of feed contained therein. The body 1, with feed-filled scoop 3 is then rotated on support 2, and returned to the active feeding position of FIG. 1. In this position, the feed in the scoop 3 is transferred downward by gravity to the lower position of receiving chamber of the body adjacent the openings 1d for access by an animal, such as a bird, wishing to feed.

The above-described embodiment describes one possible configuration, and represents the general principles embodied by the invention. Departures from the precise geometry and physical configurations shown in the figures can be practiced without departure from the contemplated invention. For example, while a generally cylindrical shape of approximately circular cross-section is employed for both the body 1 and the scoop 3, a rectangular of other cross sectional shape can be used without affecting the utility of the inventive features. In addition, the nature of the mechanisms employed to allow supported pivoting of body 1 and for retaining the body 1 in the active feeding position shown in FIG. 1 are not critical to the invention, and other suitable structural adaptations can be substituted for those shown and described herein.

It is further noted that, while not essential to the invention, both the body and the scoop will advantageously possess some degree of transparency over at least coextensive area portions thereof when assembled to enable monitoring of a level of seed remaining in the feeder, thereby giving some indication of when a refilling operation will be necessarily carried out.

It is additionally noted that while referred to as a "scoop" herein, such term for the referenced structural element is defined broadly as any suitable receptacle capable of retaining a substance, such as seed, and need not be confined to a typical scape commonly associated with conventionally available scoops used to transfer grain, nuts, etc.

Still further, while in the depicted example, body 1 and scoop 3 are approximately of comparable length, such dimensional relationship is not considered essential to the invention. For example, the entire portion of the body 1 above the pivots 1c in FIG. 1 could be eliminated, and means alternative to annular flange 3d provided for preventing the scoop 3 from bottoming against the bottom of the receiving chamber 1a. and blocking the feed openings 1d substituted therefor.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A bird feeder, comprising:
   a support;
   a body including a receiving chamber having a chamber length extending between a first end and a second end of said receiving chamber, said receiving chamber being accessible through a receiving opening in said body at said first end, said body being pivotably mounted to the support for pivoting of the body about a pivot axis running crosswise to said chamber length, said pivot axis being disposed centrally along a length of the body such that said body can be rotated between a feeding position in which the receiving opening is upwardly directed and a refilling position in which said receiving opening is downwardly directed, said body further including at least one feed station communicative with said receiving chamber providing an animal access to feed transferred to said feed station from said receiving chamber, said at least one feed station being located proximate to said second end of said receiving chamber; and
   a scoop including a feed retaining portion, said feed retaining portion being receivable in said receiving chamber through the receiving opening for at least partial accommodation thereof in the receiving chamber of the body, said feed retaining portion of said scoop being dimensioned such that at least an accommodated length portion of said feed retaining portion extends along a major length portion of said chamber length, said major length portion being greater than a minor length portion of said chamber length remaining between the feed retaining portion and said second end of the receiving chamber when received in said receiving chamber.

2. A bird feeder according to claim 1, wherein:
said body includes pivots located in radially opposed positions of the body; and
said support includes bilateral arms which rotatably engage said pivots.

3. A bird feeder according to claim 1, wherein said scoop includes a forward end which is at least partially open, said forward end being maintained above the at least one feed station when in the feeding position with the feed retaining portion of the scoop received in the receiving chamber.

4. A bird feeder according to claim 3, wherein:
said scoop is shorter in length than said receiving chamber; and
said scoop includes an annular flange which shoulders against a top edge of the body when the feed retaining portion of the scoop is received in the receiving chamber.

5. A bird feeder according to claim 1, wherein the body is selectively retainable in the feeding position.

6. A bird feeder according to claim 5, wherein:
said support includes engagement structure; and
said scoop includes cooperating structure which lockingly engages said engagement structure of said support when brought from the refilling position to the feeding position such that rotatable movement of said body relative to said support is inhibited when in said feeding position.

7. A bird feeder according to claim 6, wherein;
said scoop includes a handle; and
said cooperating structure includes at least a portion of said handle.

8. A bird feeder according to claim 2, wherein said pivots are located above a center of gravity of a combination of the scoop and the body when received therein and oriented in the feeding position.

9. A bird feeder according to claim 1, wherein said scoop and said body are of generally cylindrical configuration.

10. A bird feeder according to claim 1, wherein said scoop and said body exhibit at least partial transparency over at least coextensive area portions thereof when assembled.

11. A bird feeder according to claim 1, wherein said scoop is received in close slidable engagement with an interior of said chamber receiving chamber of said body.

12. A bird feeder according to claim 1, wherein said at least an accommodated length portion of said feed retaining portion extends to proximate said second end of said receiving chamber.

13. A bird feeder according to claim 1, wherein said at least an accommodated length portion of said feed retaining portion includes a substantial entirely of said feed retaining portion.

14. A method of refilling a bird feeder, comprising:
pivotably mounting a body containing a chamber having a chamber length extending between a first end and a second end of said chamber about a pivot axis running crosswise to said chamber length. said pivot axis being disposed centrally along a length of the body, said chamber including a receiving opening, said mounting permitting movement of the body between a feeding position in which said receiving opening is upwardly directed and a refilling position in which said receiving opening is downwardly directed;
providing a receptacle having an open end, at least a portion of said receptacle being receivable within the chamber through the receiving opening therein;
orienting the body in the refilling position;
scooping feed from a feed source using the receptacle to at least partially fill the receptacle with feed;
inserting said at least a portion of the receptacle containing the feed with the open end thereof facing upwardly through the receiving opening in the chamber which is downwardly directed for at least partial accommodation of the receptacle within the chamber such that the open end of the receptacle is located above at least one feed opening when the body is in the feeding position; and
moving the body to said feeding position with said receptacle remaining at least partially accommodated in the chamber of the body whereby the feed is transferred from the receptacle into a lower portion of the chamber and to the at least one feed opening.

15. A method according to claim 14, further comprising:
moving the body from the feeding position to the refilling position when refilling is needed;
removing the receptacle from the chamber of the body; and
repeating the at least partial filling, inserting and moving.

16. A method according to claim 14, wherein:
a length of said at least a portion of the receptacle extends a major length portion of a corresponding chamber length, said major length portion being greater than a minor length portion of said chamber length remaining between said receptacle and said second end of the receiving chamber when the at least a portion of said receptacle is received in said chamber; and
said at least partially filling the receptacle with feed includes filling a major portion of the receptacle with the feed.

17. A method according to claim 14, wherein said at least a portion of said receptacle extends to proximate said second end of said chamber.

18. A method of refilling a bird feeder, comprising:
mounting a body having at least one feed opening and containing a chamber having a chamber length extending between a first end and a second end of said chamber, said chamber including a receiving opening, said mounting permitting movement of the body between a feeding position in which said receiving opening is upwardly directed and a refilling position in which said receiving opening is downwardly directed;
providing a scoop including a feed containing portion in which feed is containable;
orienting the body in the refilling position;
scooping feed from a feed source using the scoop to at least partially fill the feed containing portion with feed;
inserting the scoop upwardly through the receiving opening in the chamber which is downwardly directed for accommodation of at least a substantial entirety of said feed containing portion of the scoop within the chamber such that a forward end of the scoop is located above the at least one feed opening when the body is in the feeding position; and
moving the body to said feeding position with said scoop remaining at least partially accommodated in the chamber of the body whereby the feed is transferred from the feed containing portion of the scoop into a lower portion of the chamber and to the at least one feed opening.

* * * * *